United States Patent
Rocheleau et al.

(10) Patent No.: US 6,262,747 B1
(45) Date of Patent: Jul. 17, 2001

(54) DEVICE-INDEPENDENT TRAPPING

(75) Inventors: Richard G. Rocheleau, Seattle; John P. Felleman, Mercer Island, both of WA (US)

(73) Assignee: Adobe Systems Incorporated, San Jose, CA (US)

(*) Notice: Subject to any disclaimer, the term of this patent is extended or adjusted under 35 U.S.C. 154(b) by 0 days.

(21) Appl. No.: 08/738,608

(22) Filed: Oct. 29, 1996

(51) Int. Cl.[7] .................... G06T 15/30; G06T 11/00; G06T 11/40
(52) U.S. Cl. ................. 345/434; 345/433; 345/429; 345/431
(58) Field of Search .................. 345/434, 431, 345/429, 430, 435; 395/109, 117

(56) References Cited

U.S. PATENT DOCUMENTS

| | | | |
|---|---|---|---|
| 5,295,236 | 3/1994 | Bjorge et al. ............ | 345/434 |
| 5,542,052 | * 7/1996 | Deutsch et al. .......... | 345/431 |
| 5,668,931 | * 9/1997 | Dermer ................... | 395/104 |

* cited by examiner

Primary Examiner—Mark K. Zimmerman
Assistant Examiner—Chante' Harrison
(74) Attorney, Agent, or Firm—Fish & Richardson P.C.

(57) ABSTRACT

A computer-implemented method traps an edge in a color page described by page data, independently of the output device. The method comprises identifying, based on page data for a color page, an edge and first and second adjacent regions having the edge as a common boundary. defining a clip region, including the edge and at least part of one of the first and the second regions, and generating and storing device-independent trap data representing the clip region for use by an unspecified output device for trapping the edge. A page trapped by the method for output on an unspecified output device includes trap data for at least one edge represented in the page, the trap data for each edge comprising edge data, defining the edge, adjacent region data, describing a first and a second adjacent region sharing the edge as a common boundary, and clip region data, defining a clip region including the edge and at least part of the first or the second adjacent regions.

14 Claims, 3 Drawing Sheets

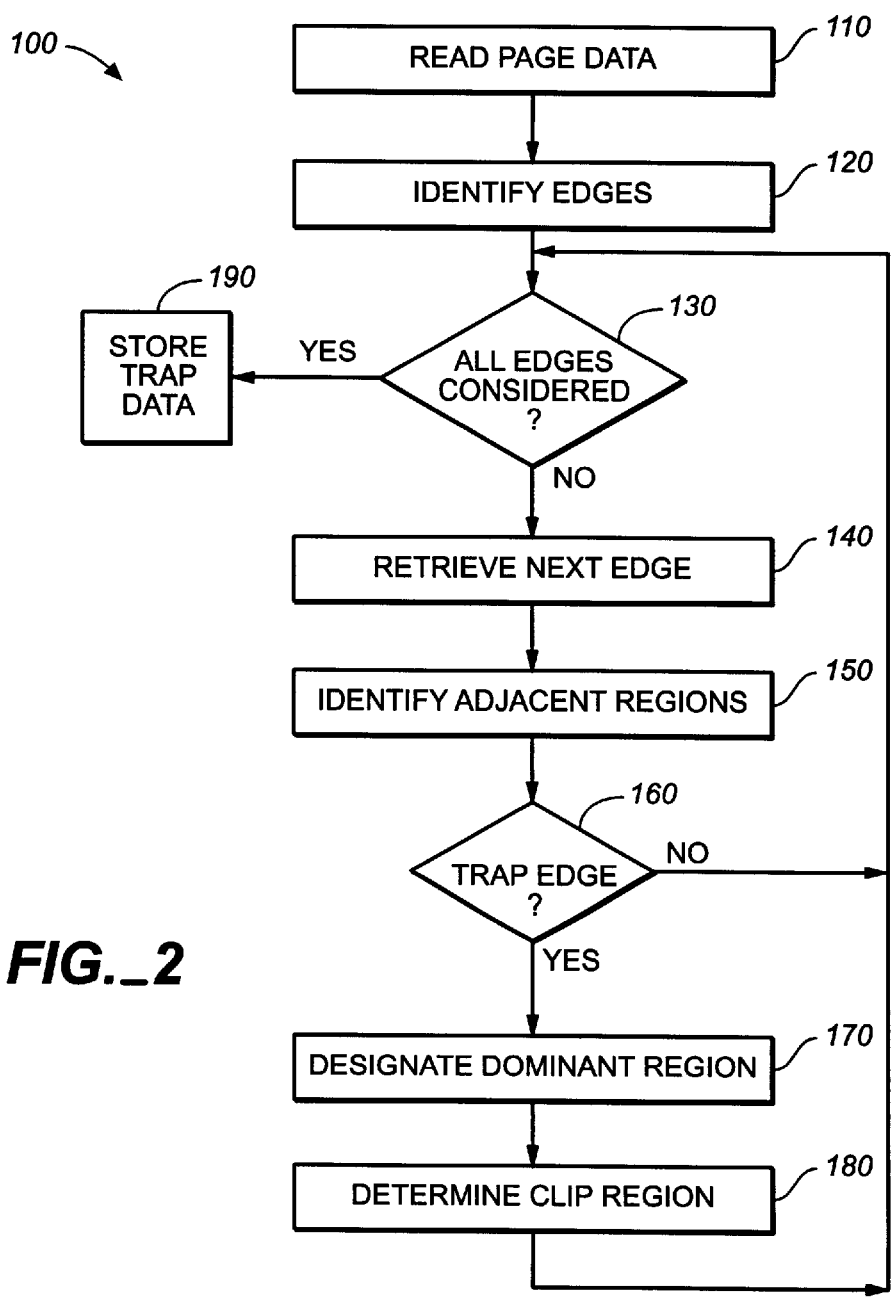

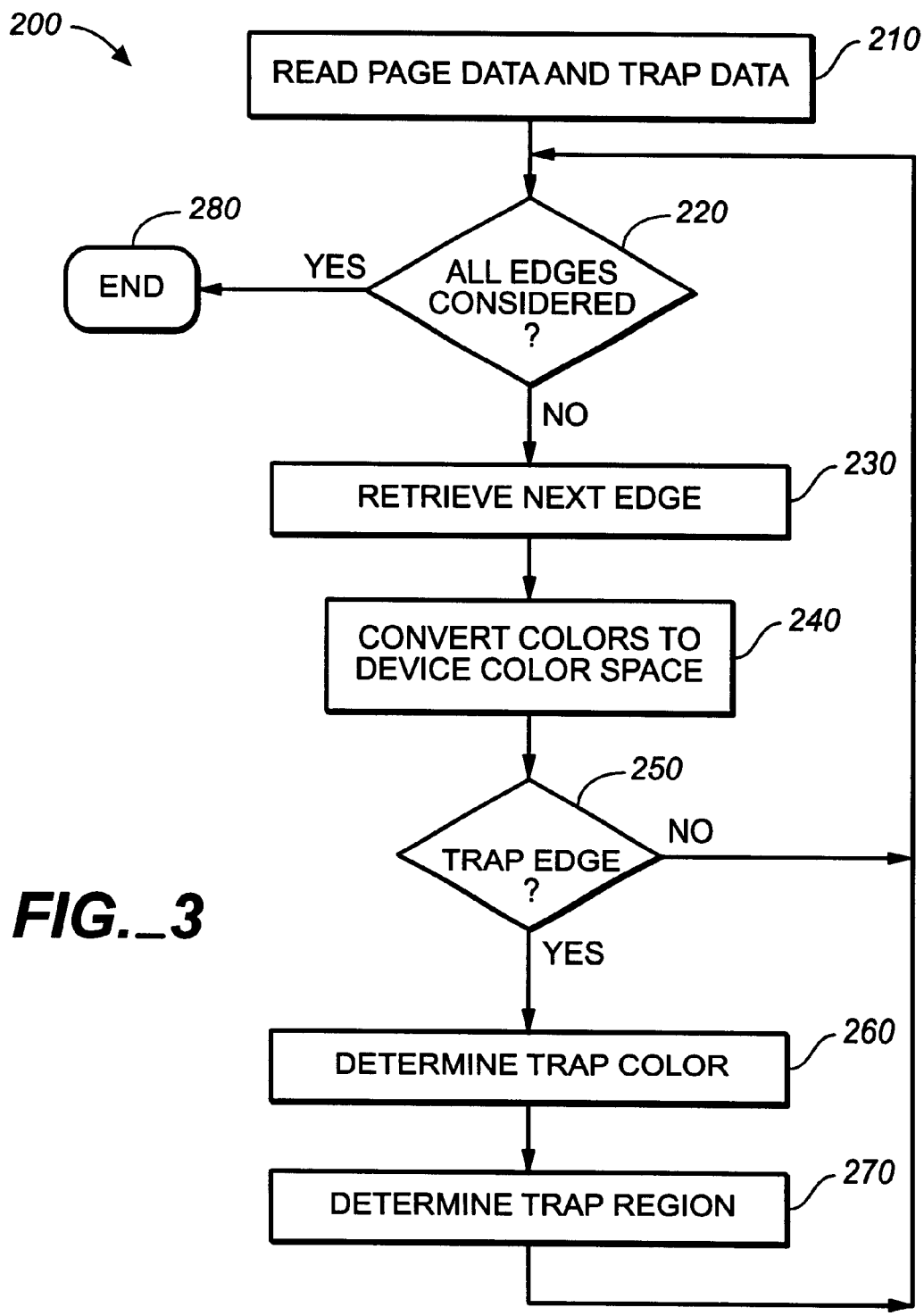
FIG._3

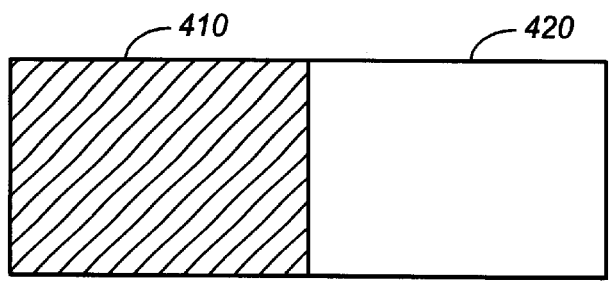
FIG._4a
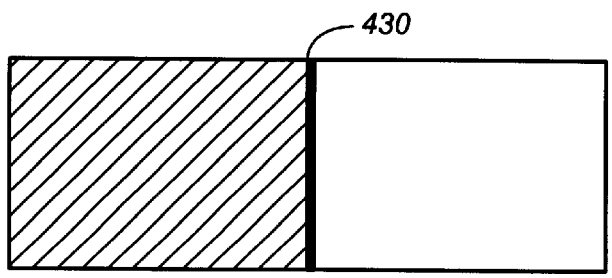
FIG._4b
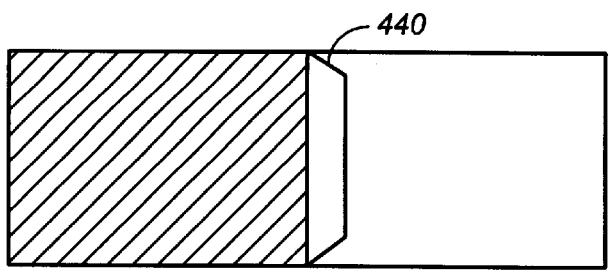
FIG._4c
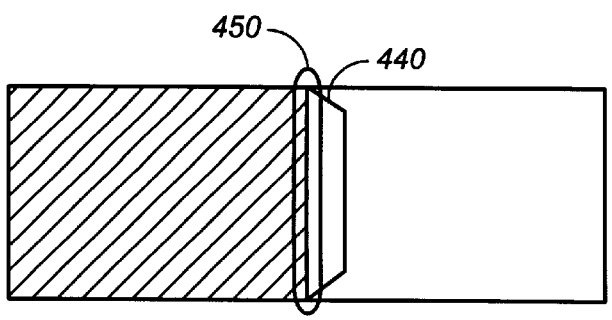
FIG._4d
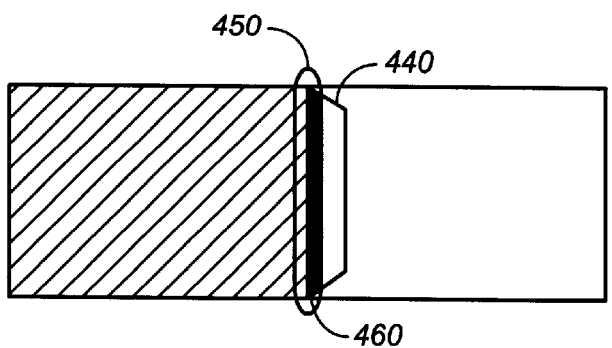
FIG._4e

DEVICE-INDEPENDENT TRAPPING

BACKGROUND

The present invention relates to computer-implemented trapping processes.

As the use of desktop publishing increases, techniques for preparing and reproducing pages on a variety of output devices have been developed. Such output devices include image setters, printers, monitors, and digital printing presses.

A page may include various types of objects, such as text, line art, and images, and its appearance is generally described by page description language ("PDL") instructions that are interpreted by an output device to create physical output having the desired appearance.

A color page additionally includes information of the colors used in the page. Colors are defined in accordance with a "color space," which provides a data representation of a range of colors (a "color gamut") in terms of basic color components. The specific color components will vary depending on the color system used. For example, in the CMYK color system, colors are represented as combinations of cyan (C), magenta (M), yellow (Y), and black (or "key") (K); in the RGB color system, colors are represented as combinations of red (R), green (G), and blue (B).

A color in the page is generally represented by a series of bits, with specific bits indicating the amount of each basic color component used in the color. For example, a 24-bit RGB data representation may allocate bits 0–7 to indicate the amount of red, bits 8–15 to indicate the amount of green, and bits 16–23 to indicate the amount of blue.

These data representations of colors are used to create color separations, which are used by color output devices to output the page. Generally, each color separation used by an output device will correspond to a color component of the color system used by the device. For example, data representations of colors in a page output on an image setter using a CMYK color system will be used to create color separations for cyan, magenta, yellow, and black, with each separation indicating regions where the corresponding ink should be applied, as well as the amount of ink that should be applied. The same color data for the page, if output on an image setter using an RGB color system, will be used to create color separations for red, green, and blue inks. The output page includes the combination of each of the inks, applied according to its corresponding separation.

Misalignment of separations can cause unintentional gaps or overlaps at edges of color regions in the output page. For example, at an edge separating two regions of different colors, misalignment may result in an output page having a gap between the two regions. At an edge separating a color region from a paper (no color) region, if the color is created from multiple separations, misalignment of those separations may result in an output page having one separation ink extending beyond the other separation inks for that color region.

To minimize the effects of misalignment, a technique known as trapping adjusts the shapes of color regions at these edges by spreading (expanding) some separation color regions to prevent gaps, and choking (contracting) other separation color regions to prevent overlaps. The adjusted areas into which inks will be spread or from which inks will be contracted are referred to as "trap regions," and trapping also entails determination of the amount of ink to be applied to the trap regions for each affected separation.

Trapping thus involves adjusting the separations created by an output device for a page. Because separations correspond to the inks used by an output device, and because different output devices may use different inks, trapping has traditionally been considered to be device-dependent.

Retrapping is used for output devices using inks of different color systems (e.g., RGB inks versus CMYK inks), as well as for output devices using the same color system. For example, two devices may both use a CMYK system, but the inks of one device may be different shades from the inks of the other device. Accordingly, a page having an output color created from, for example, just the magenta ink on a first output device, may be created from a combination of magenta and cyan inks on a second output devices, and therefore, may be trapped differently on the two devices.

Another reason why retrapping may be required is that two output devices may have different color gamuts—i.e., a specific color provided on a first output device may not be within the range of colors available on a second output device. In this case, the second device will approximate the specified color with the closest available color, but the ink combination used will likely be different from that used by the first device, and therefore may require separate trapping.

Yet another source of differences is that colors of a page are often represented in a color space (the "page color space") independent of any device color space. At output, each device uses separations created by converting the page colors into its specific device color space, and any differences in the conversion for different output devices may result in different separations requiring different trapping.

For reasons such as these, a color page is generally not trapped until an output device is specified, and is retrapped for each output device using different separations.

SUMMARY

In general, in one aspect, the invention provides a computer-implemented method for device-independent trapping of an edge in a color page described by page data by identifying an edge, and first and second adjacent regions having the edge as a common boundary, based on the page data, defining a clip region including the edge and at least part of one of the first and the second regions, and generating and storing device-independent trap data representing the clip region for use by an unspecified output device for trapping the edge.

Embodiments of the invention may include one or more of the following features.

The method identifies an edge having a first adjacent region of a first color and a second adjacent region of a second color. The method designates one of the first and the second colors as a dominant color, and designates the adjacent region having the dominant color as a dominant region. The clip region is defined to include the edge and at least part of the designated dominant region.

The method designates the dominant color as the color having the higher neutral density.

The method identifies an edge having a first adjacent region of a first color and a second adjacent region of a second color. The method determines a parameter measuring the similarity of the first color and the second color. If the parameter exceeds a predetermined threshold, the clip region is not defined and trap data is not generated or stored.

The method identifies an edge having a first adjacent region with a first color and a second adjacent region with no color. The method determines whether the first color is comprised of a first color component having a high neutral density and a second color component having a low neutral density, and if the difference between the neutral densities of the first and second color components falls below a predetermined threshold, the method does not define a clip region and does not generate or store trap data.

In general, in another aspect, the invention is a computer-implemented method for determining a trap region for an edge in a color page described by page data and trap data for an output device. The method comprises identifying, based on the page data and trap data, an edge defining a common boundary for a first and a second adjacent region, and a clip region including the edge and at least part of one of the first and the second adjacent regions. The method defines a stroke region, including the edge, for an output device, and defines a trap region comprising the intersection of the clip region and the stroke region.

Embodiments of the invention may include one or more of the following features.

The method identifies an edge between a first adjacent region having a first color and a second region having a second color, the first and second colors being defined in a page color space. The method converts the first color and the second color from the page color space to a device color space of the output device, determines color separations for the first and second adjacent regions for the output device, based on the first and the second colors defined in the device color space, and determines, based on the color separations, whether to determine a trap region for the edge.

The method identifies an edge between a first adjacent region having a first color and a second region having a second color, the first and second colors being defined in a page color space. The method converts the first color and the second color from the page color space to a device color space of the output device, and determines a trap color for the trap region based on the first and the second colors defined in the device color space. The trap color may be determined based on a predetermined function of the first and the second colors, and may be determined based on whether the trap region falls within the first adjacent region or the second adjacent region.

The method determines a trap region, partially falling within the first adjacent region and partially falling within the second adjacent region. The method separately determines the color of the trap region for the parts of the trap region falling within the first and the second adjacent regions.

In general, in another aspect, the invention is a page for output on an unspecified output device, the page including trap data for at least one edge represented in the page. The trap data for each edge comprises edge data, defining the edge, adjacent region data, describing a first and a second adjacent region sharing the edge as a common boundary, and clip region data, defining a clip region including the edge and at least part of the first or the second adjacent regions.

An advantage of the invention is that device-independent trapping operations for a page need be performed only once, even if the page is output to a variety of output devices. The efficiency benefits of the reduced processing required at output are multiplied in a distribute and print environment in which a page is simultaneously output to multiple output devices.

Other features and advantages of the invention will become apparent from the following description and claims.

BRIEF DESCRIPTION OF THE DRAWINGS

FIG. 1 is a flow chart of a device-independent trapping method.

FIG. 2 is a flow chart of Phase I of a device-independent trapping method.

FIG. 3 is a flow chart of Phase II of a device-independent trapping method.

FIGS. 4a–4e illustrate an application of the device-independent trapping method.

DESCRIPTION

Referring to FIG. 1, a page described by page data, such as PDL instructions, is trapped in two phases. Phase I (100) is device-independent, performing trapping operations that are independent of specific output devices, and determining and storing trap data reflecting the results of these operations.

At completion of Phase I (100), the page is described by both page data and trap data. Phase II (200) is device-dependent, and uses the page data and device-independent trap data to perform trapping operations for a specific output device.

Referring to FIG. 2 and the example illustrated in FIGS. 4a–4e, Phase I begins by reading page data (110), which includes data representation of the colors used in the page, defined in the page color space. Next, edges of color regions are identified (120). For example, for a page including the adjacent color regions 410, 420 illustrated in FIG. 4a, the edge 430 is emphasized in FIG. 4b. Various methods of identifying edges may be adapted for device-independent trapping. For example, U.S. Pat. No. 5,295,236, incorporated herein by reference, discloses one such method.

Depending on the method used, the device-independent trapping may identify all edges for an entire page or it may identify only a subset of edges. For example, the identified edges may be limited to specific areas of the page, or to specific edges, or to specific objects represented in the page.

While identified edges remain to be considered (130), one such edge is retrieved (140) and its adjacent regions are identified (150). An adjacent region may be a color region, in which case the color, defined in the page color space, is also identified, or it may be a paper (no color) region.

Device-independent Phase I may optionally include a trapping test 160 to determine whether to trap an identified edge. Alternatively, step 160 may be omitted and the identified edge will always be trapped.

If Phase I applies trapping test 160, trapping for an identified edge is omitted if trapping is unlikely to be required at output. In general, color-color edges separating color regions of similar colors will not be trapped at output if their representation in the device color space indicates that a common ink will be used for both regions. For example, if the adjacent colors were different shades of blue, for example, an output device will generally use at least one common ink in both regions. In such a situation, the separation corresponding to that common ink will indicate that the ink will be applied to both adjacent color regions, thus eliminating the possibility of a gap caused by misalignment.

Although the output color space and separation inks are not known during Phase I, various tests may be used to predict whether an edge will be trapped at output, regardless of the specific output device. For example, to determine whether to trap a color-color edge, one embodiment uses a test measuring the color difference of the colors of adjacent regions in the page color space. For example, the Commission Internationale de l'Eclairage ("CIE") has developed a number of standardized color spaces representing colors based on a mathematical model of human color perception.

In a system such as the CIE LUV color system, color differences may be measured by a ΔE value. If the colors are sufficiently similar (indicated by a ΔE value falling below a predetermined threshold), the colors will likely include a common ink on an output device, and trapping test (160) determines that the edge should not be trapped in Phase I. Similar measurement tests exist for other color systems as well.

For a color-paper edge separating a paper region from a region having a color including color components of a dark ink and at least one lighter ink, misalignment of the ink separations may be visually apparent at output if a lighter ink extends beyond the boundary of the dark ink into the paper region. The trapping solution chokes the lighter ink to ensure that even with slight misalignment, the lighter ink will not extend past the dark ink.

Again, the inks that will be used to output a color are not known during Phase I. However, trapping tests exist which can be used to predict whether a color-paper edge is likely to be trapped at output, regardless of the specific output device. In one embodiment, the test is based on a color component's neutral density, which gives a general indication of the opacity of the color component. If the difference between the neutral densities of the color components in the page color space exceeds a predetermined threshold, the color-paper edge is trapped.

If optional trapping test 160 is included in Phase I, and its application determines that an identified edge need not be trapped, Phase I does not trap the edge and retrieves the next edge to be considered, if any still exist (130, 140).

If optional trapping test 160 is not included in Phase I, or if its application determines that trapping is required, Phase I (100) compares the colors of the identified adjacent regions of the edge and designates a dominant region (170). Dominance may be based on a variety of factors and generally is used to predict which of a plurality of colors would visually dominate if overlapped on an output page.

In one embodiment, neutral density is used to indicate dominance. Thus, for a color-color edge, the region having a color of higher neutral density in the page color space is the dominant region; for color-paper edges, the color region is the dominant region.

Phase I next determines a "clip region" for an edge to be trapped (180). In general, the clip region represents the largest possible trap region for the edge and may be determined by various methods. In one embodiment, the clip region extends into the dominant color region, representing, for a color-color edge, the region into which the non-dominant color(s) is spread, and for a color-paper edge, the region from which the non-dominant color(s) is choked. For example, FIG. 4c illustrates a possible cip region 440 where color region 420 is determined as the dominant region.

Various methods may be used. In one embodiment, the determined clip region is based on a predetermined maximum acceptable misalignment. For example, a predetermined value of four points will create a clip region having a width of four points, indicating no gap will be apparent for any misalignment of up to four points.

Different methods of determining the shape of the clip region 440 also exist. One embodiment determines the clip region based on a predetermined function of the edge. For example, the clip region for a straight edge may be a trapezoid contained within the dominant region, having its base along the edge, as is illustrated by the clip region 440 of FIG. 4c.

Once the clip region is determined, Phase I determines whether any identified edges remain to be considered for device-independent trapping (130). If edges remain, the next edge is retrieved (140) and the process repeated (150, 160, 170, 180). If all identified edges have already been considered, the determined trap data—including information such as identification of each trapped edge, and for each of the trapped edges, identification of its adjacent regions, its dominant region, and its clip region—is stored so that an output device can access both the page data and the corresponding trap data determined for the page (190). In one embodiment, the determined trap data is encoded in PDL instructions compatible with the existing page data, and is appended to the page data. Alternatively, the determined trap data may be stored in a separate file.

Referring to FIG. 3 and the example illustrated in FIGS. 4a–4e, device-dependent Phase II (200) reads the page data and the trap data (210) and evaluates each edge trapped in Phase I (100) to determine whether to trap the edge for a specific output device. The steps of Phase II may be performed by a processor such as that in a personal computer, or in an output device such as an image setter.

Phase II retrieves an edge trapped in Phase I (220, 230) and converts the colors of the regions adjacent to the edge from representation in the page color space into representation in the device color space (240). Conversion may be implemented with various techniques, including conversion formulas and look-up tables.

Phase II (200) next evaluates the colors in the device color space to determine whether to trap the edge (250). Color-color edges are generally trapped unless adjacent color regions include sufficient amounts of common inks used in both regions, preventing visually apparent gaps resulting from misalignment. Various thresholds of sufficient commonality may be used depending on the application.

For color-paper edges, Phase I (100) may have performed device-independent trapping for all color-paper edges. However, while trapping color-paper edges can improve the output appearance of a page, such trapping may be prohibitively expensive unless selectively applied. Misalignment is most apparent for color-paper edges of color regions having components of a high-density blackish ink and at least one other ink. Accordingly, Phase II (200) preferably evaluates the edge in the device color space and creates output traps only for those color-paper edges having a color created by the device from a mixture of at least two inks, one of which is a high-density blackish ink.

If the edge is not trapped, the Phase II evaluates whether additional edges remain to be considered (220, 230).

If the edge is trapped, Phase II determines a trap color in the device color space (260). Different methods of determining a trap color may be used. One embodiment uses the non-dominant color as the trap color for a color-color edge. A different embodiment determines the trap color as a predetermined function of the colors of adjacent color regions, using the maximum inks used in the colors. For example, for a device color space using a CMYK color system, if a color in one color region is created from 0% C, 100% M, and 80% Y inks, and the color of the adjacent color region is created from 100% C, 60% M, and 0% Y inks, the resultant trap color will be 100% C, 100% M, and 80% Y inks.

For a color-paper edge, the trap color will generally be the dark high-density ink.

One embodiment traps an edge for output by drawing a stroke ("stroking") along the edge, the stroke generally having a width sufficient to camouflage gaps that may result from misalignment. The trap region is the area limiting the stroke to the clip region determined in Phase I (270). A stroke region 450 is illustrated in the example of FIG. 4d, and the relationship between the stroke region 450, clip region 440, and trap region 460 is illustrated in FIG. 4e.

The example illustrated in FIGS. 4a–4e shows a color-color edge, for which a trap color is spread into the trap region. For a color-paper edge, the trap color will remain in the trap region and all other colors will be choked away from the trap region.

Once the trap region and color have been determined (260, 270), Phase II evaluates whether any edges trapped in Phase I remain to be considered in Phase II (220). If trapped edges remain to be considered, the next edge is retrieved (230) and the device-dependent trapping process repeats (240, 250, 260, 270). If all the trapped edges have already been considered, trapping of the page is complete (280).

The methods described herein for page trapping may be implemented in hardware, firmware, or equivalents such as ASICs. Alternatively, they may also be implemented through software products, such as a computer program storage device storing instructions for execution by a computer. Such storage devices may include forms of non-volatile memory including semiconductor memory devices such as EPROMs, EEPROMs, and flash memory devices, magnetic disks such as internal hard disks and removable disks, magneto-optical disks, and CD-ROM disks.

While the invention is described in terms of a software implementation, the invention may be implemented in hardware or software, or a combination of both. Preferably, the invention is implemented in a software program executing on a programmable processing system comprising a processor and memory. Typically, the processor and memory will be embedded in a personal computer, although they may alternatively be embedded in any peripheral device capable of processing the color object in accordance with the invention described herein.

Other embodiments are within the scope of the claims. For example, a page may include objects described in different page color spaces, in which case the invention may be adapted to recognize that colors of adjacent color regions may be described in different color spaces.

Another variable feature is the method of storing the trap data determined in Phase I (100). The trap data may be appended or combined with the page data, or may be stored separately from the page data, as long as an output device can access both the page data and the trap data for an output page.

What is claimed is:

1. A computer-implemented method for device-independent trapping of an edge in a color page described by page data, the page data including a data representation of colors defined in a page color space, where the color page is to be printed on a particular output device in a different output device color space, the method comprising:
    identifying an edge in the page and first and second adjacent regions having the edge as a common boundary including identifying a color in the page color space associated with each of the first and second adjacent regions;
    predicting whether an edge will be trapped at output, regardless of the specific output device;
    if the edge requires trapping, determining a clip region, including the edge and at least a portion of one of the first and the second regions, the clip region defining a largest possible trap region for the edge for any output device, the clip region defining a clipping path to be applied to a stroke region determined while trapping the color page for printing on the output device; and
    generating and storing device-independen trap data representing the clip region for use by the particular output device in trapping the edge.

2. The method of claim 1 wherein the first adjacent region has a first color and the second adjacent region has a second color, the method further comprising:
    designating one of the first and the second colors as a dominant color; and
    designating the adjacent region having the dominant color as a dominant region, wherein the clip region is defined to include the edge and at least part of the designated dominant region.

3. The method of claim 2, wherein designation of a dominant color further comprises determining a neutral density of the first color and a neutral density of the second color, wherein the color having the higher neutral density is designated as the dominant color.

4. The method of claim 2 wherein the first adjacent region has a first color and the second adjacent region has no color, and the first region is designated as the dominant region.

5. The method of claim 1 wherein the first adjacent region has a first color and the second adjacent region has a second color, the method further comprising determining a parameter measuring the similarity of the first color and the second color, wherein if the parameter exceeds a predetermined threshold, the clip region is not defined and trap data is not generated or stored.

6. The method of claim 1 wherein the first adjacent region has a first color and the second adjacent region has no color, the method further comprising:
    determining whether the first color is comprised of a first color component having a high neutral density and a second color component having a low neutral density, wherein if the difference between the neutral densities of the first and second color components falls below a predetermined threshold, the clip region is not defined and trap data is not generated or stored.

7. A computer-implemented method for trapping a color page for printing by a particular output device, the color page described by page data and trap data for an unspecified output device, the trap data generated by predicting whether an edge will be trapped at output, regardless of the specific output device, the method comprising:
    screening the trap data to locate edges to trap for the particular output device including
        retrieving trap data for an edge defining a common boundary for a first and a second adjacent region in the color page, and a clip region including the edge and at least part of one of the first and the second adjacent regions;
        converting colors associated with the first and second adjacent regions from a representation in a page color space to a representation in a device color space of the particular output device;
        determining if the edge requires trapping based on the colors in device color space for the first and second adjacent regions;
    if the edge requires trapping, defining a stroke region, including the edge, for the particular output device; and
    defining a trap region comprising the intersection of the clip region and the stroke region.

8. The method of claim 7 wherein the first adjacent region has a first color and the second region has a second color, the first and second colors being defined in a page color space, the method further comprising:

converting the first color and the second color from the page color space to the device color space of the particular output device;

determining color separations for the first and second adjacent regions for the particular output device, based on the first and the second colors defined in the device color space; and determining, based on the color separations, whether to determine a trap region for the edge.

9. The method of claim 7 wherein the first adjacent region has a first color and the second region has a second color, the first and second colors being defined in a page color space, the method further comprising:

converting the first color and the second color from the page color space to a device color space of the particular output device; and determining a trap color for the trap region based on the first and the second colors defined in the device color space.

10. The method of claim 9, wherein the trap color is determined based on a predetermined function of the first and the second colors.

11. The method of claim 9, wherein the trap color is determined based on whether the trap region falls within the first adjacent region or the second adjacent region.

12. The method of claim 9, wherein a part of the trap region falls within the first adjacent region and a part of the trap region falls within the second adjacent region, and the trap color of the trap region is separately determined for the parts of the trap region falling within the first and the second adjacent regions.

13. A page for output on an unspecified output device, the page including device-independent trap data for at least one edge represented in the page, the device-independent trap data comprising:

edge data for every edge in the page predicted to require trapping for some as yet unspecified output device, the edge data defining the edge;

adjacent region data, describing a first and a second adjacent region sharing the edge as a common boundary including color data defining a color in a page color space for each adjacent region; and clip region data, defining a clip region including the edge and at least part of the first or the second adjacent regions, where the clip region defines a largest possible trap region for the edge for any output device, the clip region defining a clip path to be applied to a stroke region determined while trapping the page for printing on the unspecified output device.

14. A computer-implemented method for trapping a color page described by page data where the page data includes a data representation of colors defined in a page color space, the method comprising:

predicting whether an edge will be trapped at output, regardless of the specific output device, including identifying an edge in the page and first and second adjacent regions having the edge as a common boundary including identifying a color in the page color space associated with the first and second adjacent regions;

generating and storing device-independent trap data for use by an unspecified output device in retrapping the edge;

identifying an output device;

retrieving the device-independent trap data for the edge; and retrapping the edge including
converting colors associated with the first and second adjacent regions from a representation in a page color space to a representation in a device color space of the output device;
determining if the edge requires retrapping based on the colors in device color space for the first and second adjacent regions; and
if the edge requires retrapping, generating and storing output device trap data for use by the output device in trapping the edge.

* * * * *

UNITED STATES PATENT AND TRADEMARK OFFICE
CERTIFICATE OF CORRECTION

PATENT NO. : 6,262,747 B1  
DATED : July 17, 2001  
INVENTOR(S) : Richard G. Rocheleau and John P. Felleman Page 1 of 1

It is certified that error appears in the above-identified patent and that said Letters Patent is hereby corrected as shown below:

<u>Title page,</u>  
Item [56] References Cited,  
U.S. PATENT DOCUMENTS, please insert the following document:  
-- 5,438,653  08/1995  Boenke et al.  395/131 --  
FOREIGN PATENT DOCUMENTS, please insert the following documents:  
-- 0 620 534 A1  10/1994  EPO  
   0 674 277 A2  09/1995  EPO  
   2 291 573 A  01/1996  GB --  
OTHER PUBLICATIONS, please insert the following document:  
-- Roth, S., "Setting Traps," MacWorld, pp. 159-161, 5/1991 --

<u>Column 8,</u>  
Line 3, please replace "device-independen" with -- device-independent --.

Signed and Sealed this

Twenty-eighth Day of May, 2002

Attest:

Attesting Officer

JAMES E. ROGAN  
*Director of the United States Patent and Trademark Office*